United States Patent Office 3,437,912
Patented Apr. 8, 1969

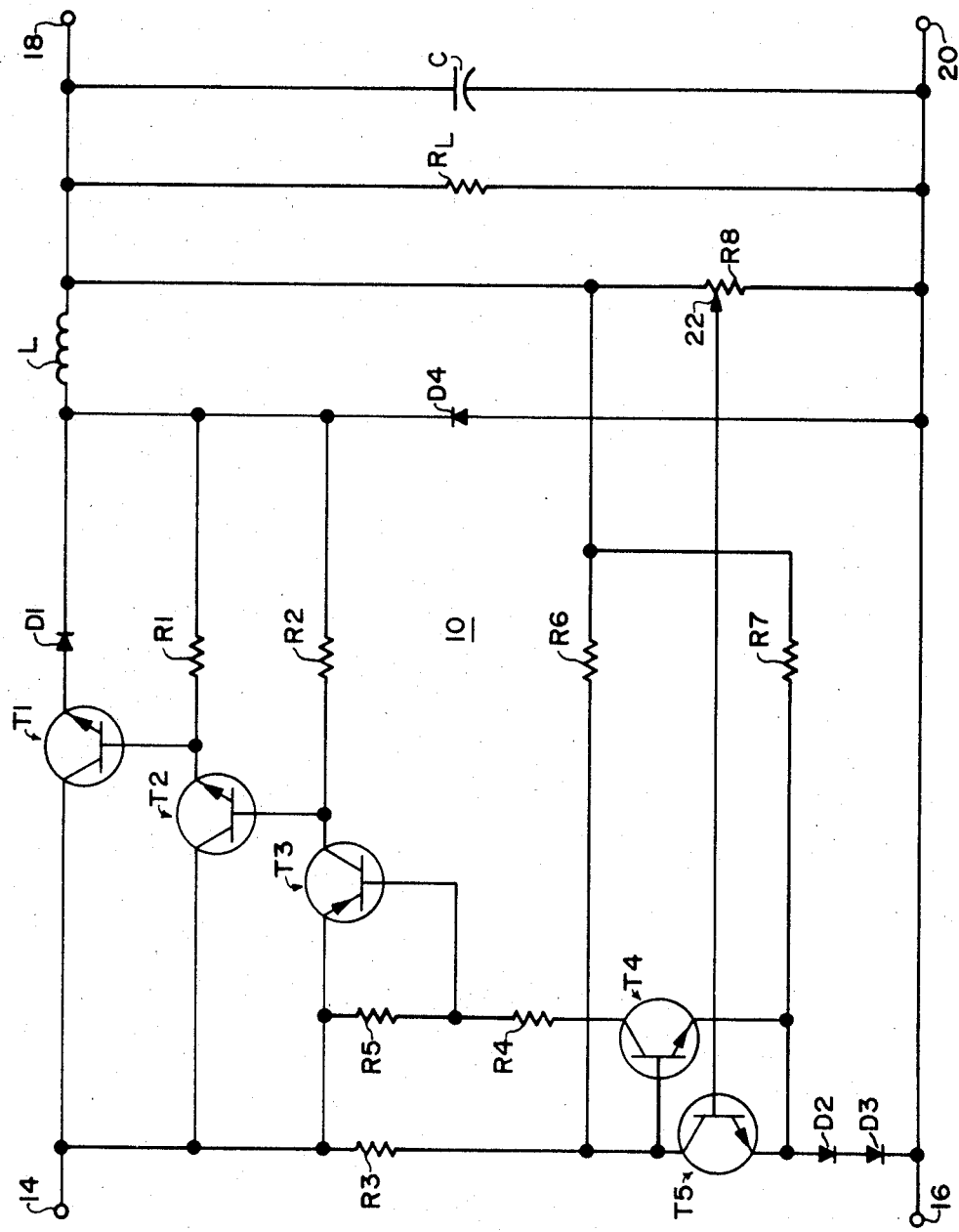

3,437,912
CONSTANT POTENTIAL POWER SUPPLY
David Morris, Brooklyn, N.Y., assignor to General
Precision Inc., Little Falls, N.J., a corporation of
Delaware
Filed Dec. 30, 1966, Ser. No. 606,146
Int. Cl. G05f 1/40; H02p 13/16
U.S. Cl. 323—22                  7 Claims

ABSTRACT OF THE DISCLOSURE

A constant potential power supply for use in airborne equipment having an integrating capacitor across its output and which is maintained charged to potentials within a predetermined range. The capacitor discharges through the power supply load and a Schmitt type trigger is actuated as the output potential reaches a certain minimum value. The change in state of the trigger, through additional circuitry causes a line switch to close, applying a charging current to the capacitor. On reaching a certain maximum output potential value, a reverse action occurs, opening the switch. Bias potentials applied to the trigger from the power supply output terminal through resistive elements facilitate faster and more effective trigger action, effecting a lower hysteresis, or difference between maximum and minimum output potentials.

---

This invention relates to electrical circuitry and, more particularly, to electrical power supplies capable of supplying a regulated electrical potential within close tolerances and over varying load conditions.

Electrical circuits usually perform best when their power requirements are supplied by a source of constant potential or at least a potential varying over a narrow range and in many cases, the narrower the range of variation, the better the performance. In situations wherein size and weight of the power supply are significant factors, as, for example, in the case of airborne electronic equipment, the problems associated with providing a substantially constant potential power supply, are accentuated. Clearly, in airborne applications, it is preferable that the equipment and its components be small, light, compact, and of low power requirements.

Various constructions have been proposed for achieving well regulated, constant potential power supplies, with low output variation for airborne use, some with considerable success. These have included switching type regulators in which an unregulated direct potential source is selectively interconnected with a potential integrator by an electronic switch, which, in turn, is controlled to close as the output potential at the integrator diminishes to some predetermined minimum value and to open as this potential reaches some maximum value. In power supplies adapted for low potential applications, a circuit such as the Schmitt trigger may be used for detecting the "error"; that is, the minima and maxima of potential and the electronic switch may take the character of a transistor or an equivalent. While these regulated power supplies have been largely effective in providing an output potential of low variation, they require several stages of amplification between the "error" detector of the circuit and the main controlling switch device in order to provide the required regulation and are limited to relatively low potentials.

Another type of regulated power supply, the pulse width modulate power supply, effective for low or high potential applications, has also met with considerable success in airborne applications. However, this construction similarly requires the mentioned amplification stages and in addition requires a master oscillator or multivibrator as an adjunct for purposes of timing.

In each of the aforedescribed prior types of constant potential, regulated power supplies, the constancy of potential provided is clearly dependent upon the variation between the mentioned minimum and maximum potentials at which the controlled switch is actuated into conduction and cut off, the smaller the variation, the more nearly constant the output potential. This variation which is frequently termed "hysteresis," in accordance with this invention, is greatly reduced by the novel provision of circuit components serving to effect a more sensitive Schmitt-type trigger circuit having reduced switching times.

In the quiescent state of the trigger circuit, the one transistor is maintained cut off by a bias developed across a pair of diodes serially connected between the interconnected emitters of the trigger transistors and ground. These diodes present a low dynamic impedance in comparison with resistors and the dynamic impedance is even further reduced by a bias current through the diodes. In accordance with one feature of this invention, such a bias current is derived simply by a resistive interconnection between the output terminal of the power supply and the ungrounded electrode of the diode pair. Thus, the emitter bias for the trigger transistors varies with the output potential as well as facilitating a diode bias which lowers the dynamic impedance of the diodes. As will be clear, such a variable bias effects a novel performance of the trigger transistors to provide quicker switching action. Bias potential derived from the output terminal of the power supply is also applied through a resistor to the base of the transistor which is cut off in the quiescent state. Such a bias raises the potential of the base of the cut off transistor to near conduction thereof placing it in a state of anticipating conduction whereby the change from cut-off to conduction is greatly facilitated. In addition, such a bias forces a greater current through the conducting transistor. This in turn requires a greater base drive of the conducting transistor. As a consequence, if the conducting transistor cannot obtain this increase in base current demand, it will become cut off at a higher base potential or in other words, cut off is more readily and quickly effected. By appropriate control and proportioning of the biasing circuit, including biasing resistors in relation to the output potential, the trigger transistors may be controlled to provide a more effective, quicker, trigger action, reducing the hysteresis of the circuit and improving the regulation of the power supply.

It is therefore a principal object of this invention to effect improved potential regulation of relatively high electrical potentials, especially in airborne applications, with equipment that is relatively simple, light, small, and having reduced operating power requirements.

It is another object of this invention to facilitate the provision of a well-requated, direct potential of minimal variation without the requirement of auxiliary timing components or equipment.

The novel features characteristics of the invention are set forth in the appended claims. The invention itself, together with further objects and advantages thereof may best be understood with reference to the accompanying drawing in which the single figure is a schematic wiring diagram of a regulated power supply according to this invention.

For a more detailed description of the invention, reference is made to the drawing wherein the circuit of the constant potential power supply as a whole is represented by the numeral 10 and has a pair of input terminals 14 and 16 and a pair of output terminals 18 and 20, the terminals 16 and 20 being connectable to ground. In the operation of the circuit 10, a direct electrical potential is applied across input terminals 14 and 16 or in the case of the source of alternating potential, it is preferably rectified and filtered by components, not shown, and not forming a part of the invention herein, before being applied to the input terminals of this circuit.

A switching transistor T1 of the NPN type is provided with its collector and emitter electrodes connected in series with a diode D1 and inductor L between input terminal 14 and output terminal 18. The diode D1 has its anode connected to the emitter of transistor T1 and its cathode to inductor L whereby this diode is poled to pass conventional current from terminal 14 to terminal 18. A second transistor, T2, of the NPN type is provided with its collector connected to input terminal 14 and its emitter connected to both the base of transistor T1 and through a resistor R1 to the junction between diode D1 and inductor L. The transistors T1 and T2 thus are connected in the form of a Darlington pair and are driven by a transistor, T3, of the NPN type, having its emitter connected to input terminal 14 and its collector connected to both the base of transistor, T2, and through a resistor R2, to the junction between the diode D1 and inductor L.

A Schmitt trigger type of circuit is formed by a pair of transistors T4 and T5, both of the NPN type having their emitters joined, the collector of transistor T5 interconnected directly with the base of transistor T4 and connected through a resistor R3 to input terminal 14. The collector of transistor T4 is connected through a resistor, R4, to the base of drive transistor T3. A resistor, R5, is interconnected between input terminal 14 and the base of transistor T3.

A load resistor $R_L$ is also connected across the output terminals 18 and 20 and for integrating the electrical potential applied across terminals 18 and 20, a capacitor, C, is provided. A "free-wheeling" diode D4 is interconnected with the junction between diode D1 and inductor L to pass conventional current toward this junction.

For providing a self-biasing potential in the trigger circuit, a pair of diodes D2 and D3 are serially connected between the joined emitters of the transistors T4 and T5 and grounded terminal 16. The anode of diode D2 is connected directly to the emitters and the cathode of diode D3 is connected to the grounded terminal whereby these diodes are poled to pass conventional current from the emitters to ground. The resistance of these diodes is effective in response to such current to produce a biasing potential as occurs in the quiescent state of the trigger wherein transistor T5 is conducting and transistor T4 is cut off or in the transient state wherein transistor T4 is conducting and transistor T5 is cut off. The current of transistor T5 or T4 flowing through the diodes raises the emitter potential whereby base to emitter current in the other transistor T4 or T5 is not sustained.

The dynamic impedance of these diodes is inherently less than a corresponding acceptable resistor so disposed would be and may be even further reduced by biasing current through the diodes of such value as to operate the diodes in a region of low dynamic impedance.

In accordance with an important feature of this invention, biasing in the trigger circuit including transistors T4 and T5 is provided by a pair of resistors R6 and R7 interconnected between output terminal 18 and the base of transistor T4 and the joined emitters of transistors T4 and T5, respectively. Triggering potentials are derived from a potentiometer including a resistive element R8 connected across output terminals 18 and 20 and an arm 22 movable to contact element R8 along its length. The arm 22 is connected directly to the base of transistor T5 and thus, as the output potential varies, the potential at the base of this transistor varies proportionately. The proportion of output potential is controllable by the movement of arm 22 for selecting the appropriate triggering potential. The bias potentials provided by resistors R6 and R7 also vary with the output potential and thus, are effective to condition the trigger to provide quicker response and triggering resulting in lowered hysteresis of the power supply as a whole, producing better regulation.

With the trigger in the quiescent state, that is, transistor T4 cut-off and transistor T5 conducting heavily, resistor R6 is proportioned relative to other circuit components and output potential range so as to bias transistor T4 to be cut-off but near conduction. Thus, the transistor T4 may be considered in an "anticipation" state whereby the actual change of state in the trigger is facilitated and occurs in a shorter interval of time. In addition, this bias imposes a requirement of higher collector current for transistor T5, in turn requiring a higher base bias drive to maintain transistor T5 conducting, the effect of which is to cause switching at a higher bias potential at the base of T5. This conditions transistor T5 for change to the cut-off state and also effects a faster switching action.

The pre-bias potential produced by current through resistor R7 and diodes D2 and D3 which varies with output potential is co-operative with the other bias potentials described to maintain the proper anticipation conditions of the transistors resulting in the improved switching action described. It should be particularly noted that the dynamic impedance of diodes D2 and D3 is automatically adjusted to the changing output potential. In particular, as the output potential increases, for example, impressing an increase in bias on the base of transistor T5, tending to further maintain this transistor cut-off, a compensating influence is produced by a concomitant increase in current through resistor R7 and diodes D2 and D3 further reducing the dynamic impedance of these diodes tending to place the transistor nearer conduction.

In the operation of the circuit 10, the capacitor C is intermittently charged by current flowing from the input terminal 14 through the transistor T1 in its conductive condition, through diode D1 and inductor L and discharged through the load resistor $R_L$. The intermittent flow of such current is under the control of the transistor T1 which in turn is under the control of the Schmitt type trigger including the transistors T4 and T5. It is first assumed that the potential at output terminal 18 with respect to terminal 20 is relatively low as may exist in an initial condition of the circuit, and that a direct potential is applied between input terminals 14 and 16 and is positive at terminal 14 with respect to terminal 16. Under these circumstances, a portion of the output potential appearing at terminal 18 is applied to the arm 22 of the potentiometer 22R8 and therefore is applied directly to the base of transistor T5. In this initial condition, this potential is necessarily very low and thus, the transistor T5 is nonconductive whereby its collector and the base of transistor T4 are isolated from ground. In response to the application of the positive input potential through resistor R3 to the base of transistor T4, a base to emitter current is caused to flow in this transistor, initiating collector to emitter flow and the decreased potential appearing as a result at the collector of this transistor is applied to the base of transistor T3 through resistor R4. This latter transistor is also rendered conductive and by virtue of the conduction of transistor T3, a positive potential is developed across the resistor R2 and is applied to the base of transistor T2, causing the transistor T2 to conduct. Similarly, by virtue of the current flow through transistor T2, a positive potential is developed and applied to the base of transistor T1. This switching transistor is rendered conductive producing a current flow from the input terminal 14 through the diode D1, inductor L and capacitor C. This condition prevails until the potential at terminal 18 and the fraction thereof appearing at the arm 22 is sufficiently great that the base to emitter junction of transistor T5 is forwardly-biased rendering this transistor conductive. In this regard, it should be noted that the diodes D2 and D3 serially connected between the emitters of transistors T4 and T5 and grounded terminals 16 and 20 provide a back-bias to these emitters and that as the potential at output terminal 18 progressively increases the back bias applied to these emitters becomes less significant relative to the potential applied to the base of transistor T5 whereby ultimately the transistor T5 is rendered conductive. Under these circumstances, the transistors T4, T3, T2, and T1 are successively rendered nonconductive in a manner substantially the reverse to that described hereinabove describing the successive conduction of these transistors. By reason of the self-inductance of inductor L, after the interruption of current from terminal 14 through transistor T1, the capacitor C receives current from the inductor L and diode D4 in a circuit including these elements and the capacitor C.

The potential across the capacitor C decays in accordance with the load demands upon the charge existing on this capacitor and as the potential reaches a value low enough that the base to emitter junction of transistor T5 becomes again back-biased, a cycle of events again occurs whereby the capacitor C is again charged.

What is claimed is:

1. An electrical power supply comprising an input terminal and an output terminal, electrical potential integrating means connected between said output terminal and ground, a first active circuit device having a control electrode and a pair of additional electrodes interposed in circuit between said input and output terminals, means for controlling conduction between said pair of additional electrodes and including a trigger having a second active circuit device with a pair of electrodes resistively coupled between said input terminal and ground and a control electrode resistively coupled to said output terminal for applying a proportion of the potential at said output terminal thereto, a third active circuit device having a control electrode resistively coupled to said output terminal and a pair of additional electrodes coupled between an electrode of the pair of electrodes of said second active circuit device and said input terminal and means coupling one of the additional electrodes of said third active circuit device to the control electrode of said first active circuit device, and unidirectional current conducting means interposed between one of the additional electrodes of each of the second and third active circuit devices and ground for providing a low bias potential thereto in response to current conduction through said unidirectional means.

2. An electrical power supply according to claim 1 wherein said means coupling one of the electrodes of said third active circuit device to the control electrode of said first active circuit device includes additional active circuit devices effective to amplify the potential changes at the additional electrode of said third active device.

3. An electrical power supply according to claim 1 additionally comprising an electrical inductor interposed in series with the additional electrodes of said first active device and a unidirectional device connected between ground and one terminal of said inductor remote from said output terminal to provide current flow to said integrating means upon interruption of current in said first active circuit device.

4. An electrical power supply according to claim 1 additionally comprising a first unidirectional current conducting means and an inductor, said additional electrodes of said first active circuit device, first unidirectional current conducting means and inductor being connected in series in the order named between said input and output electrodes, a second unidirectional current conducting device connected between the junction of said inductor and first unidirectional device and ground and further unidirectional current conducting means interposed between an additional electrode of said second and third devices and ground.

5. An electrical power supply according to claim 1 wherein said second and third active circuit devices and the intercoupling therebetween and to said input electrode render the same responsive to direct potential applied between said input electrode and ground to render said second active circuit device conducting and said third active circuit device nonconducting in a predetermined range of potential of said output terminal and responsive to output terminal potentials below said range to render said second active circiut device cut-off and said third active circuit device conducting.

6. An electrical power supply according to claim 5 wherein one of the additional electrodes of each of said second and third active circuit devices are joined and resistively coupled to said output terminals.

7. An electrical power supply according to claim 5 wherein said first, second, and third active circuit devices are transistors, the control electrodes are transistor bases and the additional electrodes are collector and emitter of the transistor.

References Cited

UNITED STATES PATENTS 3,068,392    12/1962    Santelmann _____ 321—18
3,350,628    10/1967    Gallaher et al. _____ 323—4

JOHN F. COUCH, *Primary Examiner.*

A. D. PELLINEN, *Assistant Examiner.*

U.S. Cl. X.R.

307—290; 323—38